(12) United States Patent
Lundmark

(10) Patent No.: US 7,204,341 B2
(45) Date of Patent: Apr. 17, 2007

(54) VEHICLE, METHOD AND STEERING SYSTEM FOR VEHICLE

(75) Inventor: Andreas Lundmark, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 181 days.

(21) Appl. No.: 10/906,320

(22) Filed: Feb. 14, 2005

(65) Prior Publication Data

US 2006/0266574 A1    Nov. 30, 2006

Related U.S. Application Data

(63) Continuation of application No. PCT/SE03/01255, filed on Aug. 7, 2003.

(30) Foreign Application Priority Data

Aug. 14, 2002   (SE)   .................................. 0202423

(51) Int. Cl.
*B62D 5/00*    (2006.01)
*B62D 7/18*    (2006.01)

(52) U.S. Cl. .................. 180/402; 180/444; 280/93.512

(58) Field of Classification Search ................ 180/402, 180/444; 280/93.512, 93.513
See application file for complete search history.

(56) References Cited

U.S. PATENT DOCUMENTS

| 2,400,868 | A |   | 5/1946  | Le Tourneau |
|-----------|---|---|---------|-------------|
| 4,714,140 | A |   | 12/1987 | Hatton et al. |
| 4,798,394 | A |   | 1/1989  | Pollock et al. |
| 5,904,365 | A | * | 5/1999  | Dillon ........................ 280/419 |
| 6,488,114 | B1| * | 12/2002 | McMahon et al. .......... 180/414 |
| 6,494,471 | B2| * | 12/2002 | Lukac ....................... 280/93.5 |
| 6,561,307 | B1| * | 5/2003  | Brill et al. .................. 180/444 |
| 6,623,019 | B2| * | 9/2003  | Davis .................... 280/93.512 |
| 6,902,176 | B2| * | 6/2005  | Gottschalk ............. 280/93.512 |
| 7,097,184 | B2| * | 8/2006  | Kapaan et al. ......... 280/93.512 |
| 2006/0027986 | A1| * | 2/2006 | Ziech .................... 280/93.512 |

FOREIGN PATENT DOCUMENTS

EP        0334691 A1    9/1989

\* cited by examiner

*Primary Examiner*—Tony Winner
(74) *Attorney, Agent, or Firm*—Novak Druce + Quigg LLP

(57) ABSTRACT

A vehicle, method and steering system for a vehicle in which the steering system includes a stub axle articulated on a king pin. The king pin is configured to be fixed to an element spring suspension-mounted in the vehicle. The steering system includes at least one power unit fixed to the stub axle, and the power unit transmits a torque to the king pin.

22 Claims, 2 Drawing Sheets

VEHICLE, METHOD AND STEERING SYSTEM FOR VEHICLE

CROSS-REFERENCE TO RELATED APPLICATIONS

The present application is a continuation patent application of International Application No. PCT/SE03/01255 filed 7 Aug. 2003 which was published in English pursuant to Article 21 (2) of the Patent Cooperation Treaty, and which claims priority to Swedish Application No. 0202423-0 filed 14 Aug. 2002. Said applications are expressly incorporated herein by reference in their entireties.

TECHNICAL FIELD

The present invention relates to a steering system for vehicles and a method for steering vehicles.

BACKGROUND OF THE INVENTION

Modern vehicles have the front wheels suspended on a rigid front axle, the wheels each being mounted on a stub axle. The stub axles are articulated on the front axle by means of king pins which are supported at an upper and a lower bearing point on the stub axle. The front axle is fixed to the frame/chassis of the vehicle by means of two spring assemblies. For steering the vehicle, the stub axles are provided with steering arms that are connected to one another by a steering linkage and by a steering gear which transmits the steering angle from the steering wheel to the steering linkage and hence to the wheels.

Statutory requirements, particularly for heavy vehicles, govern various parameters of the steering mechanism. For example, the steering gear and the steering wheel must be designed so that a torque acting on the steering wheel will be capable of turning the wheels even when the power-assisted steering is defective.

Such a conventional steering system has a number of disadvantages. In a first instance, it is heavy. A complete steering system comprising (including, but not necessarily limited to) steering column, steering gear, one or two power steering units and the like may weigh several hundred kilograms. Secondly, a complicated wheel adjustment is required in order to align the angles of the steering system and the wheels relative to one another. Thirdly, a conventional power steering function is an unnecessary drain on energy. Fourthly, vehicles with different wheelbases and wheel installations require different Ackermann steer angles, which entails a number of different components for a whole range of vehicles. Fifthly the steering arms limit the maximum wheel angle which results in a limited turning circle radius. Sixthly vehicles with double front axles and/or multiple steered axles become extremely complicated.

SUMMARY OF THE INVENTION

An object of the present invention is therefore to provide a steering system for a vehicle which is light, flexible and easy to fit, together with a method for steering a vehicle which produces a steering system affording maximum flexibility.

In a first embodiment, the invention takes the form of a steering system for a vehicle that includes a stub axle articulated on a king pin, and in which the king pin is intended to be fixed to an element spring suspension mounted on the vehicle. In this sense, the object of the invention is achieved by the steering system including a power unit fixed to the stub axle, the power unit transmitting a torque to the king pin.

In another aspect, the invention takes the form of a method that includes the provision of at least two power units, each fitted to a separate stub axle and that are used to turn each stub axle in relation to the respective king pin fixed to the vehicle.

This first embodiment of the steering system provides a steering system for a vehicle in which each wheel can be independently steered and controlled. The advantage of this is that the steering system can readily be adapted to different vehicles in a range of vehicles. In addition, the steering system according to the invention permits independent suspension of the front wheels of the vehicle, which allows the engine to be located lower down.

In an advantageous first development (variation) of the steering system according to the invention, the steering system comprises means for transmitting the power from the power unit to the king pin. An advantage of this is that the torque exerted by the power unit can be geared so that the power unit can be adapted to the requirements of the steering system.

In an advantageous second development of the steering system according to the invention, the power unit can be electrically controlled. The advantage of this is that the power unit can be controlled via the vehicle electronic system. This makes it easy to adapt the steering system to different vehicles in a range of vehicles, for example, or to adjust the steering to different driving situations.

In an advantageous third development of the steering system according to the invention, the steering system comprises a sensor, which provides information on the wheel angle. The object of this is to be able to monitor and adjust the wheel angles automatically.

In an advantageous fourth development of the steering system according to the invention, the steering system comprises a sensor, which provides information on the torque acting on the stub axle. The object of this is to be able to monitor and adjust the wheel angles automatically.

A method according to the invention for steering a vehicle comprises a step in which each stub axle is turned in relation to the respective king pin by means of at least two power units each fitted to a separate stub axle. The advantage of this method is that it is easy to adapt a vehicle steering system to different vehicles in a range of vehicles and to different driving situations.

In an advantageous first development of the method according to the invention the control signals which control the power units are separate signals for each power unit. The advantage of this is that steering parameters can readily be adapted to different vehicles in a range of vehicles and to different driving situations. In an advantageous second development of the method according to the invention the control signal which controls the power units is a function of the vehicle speed. The advantage of this is that different steering parameters can be adjusted to the speed of the vehicle.

BRIEF DESCRIPTION OF THE DRAWINGS

The invention will be described in more detail below with reference to examples of embodiments shown in the drawings attached, in which.

DESCRIPTION OF THE PREFERRED EMBODIMENTS

The examples of embodiments of the invention described below and developments thereof must be regarded only as examples and in no way limit the scope of the patent claims. In the examples of embodiments here described the same reference numbers in the different figures relate to the same type of component. Each component is therefore not described in detail in all of the examples of the several embodiments.

Figure 1:
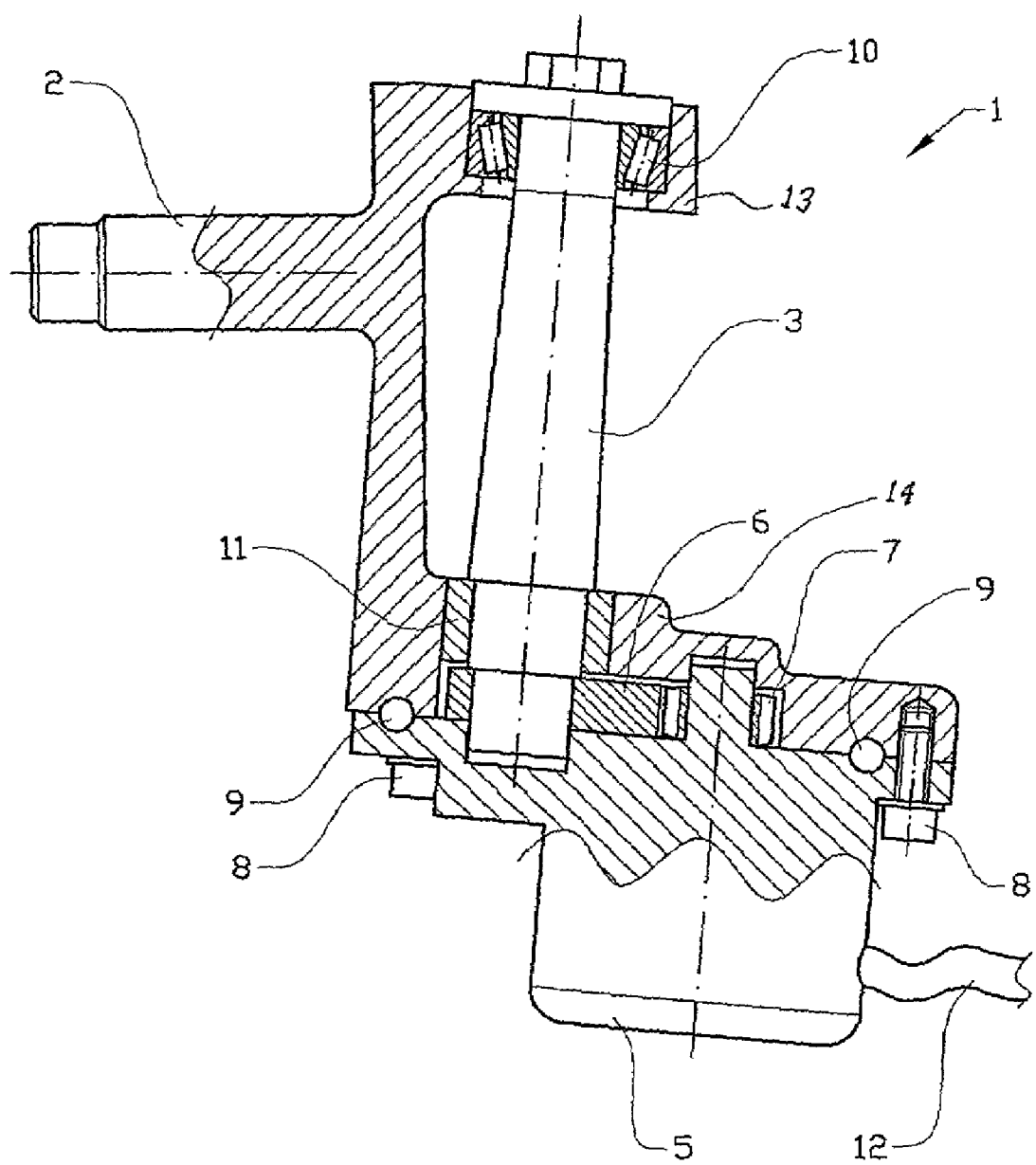
FIG. 1 is a partial cross-sectional view showing a steering system configured according to the teachings of the invention.

The steering system 1 for a vehicle shown in FIG. 1 comprises a stub axle 2, which is articulated on a king pin 3. The articulated fixing is of a design which will be known to the person skilled in the art, with an upper bearing 10, such as a tapered roller bearing, for example, and a lower bearing 11, such as a slide bearing. The upper bearing 10 is fixed to the upper leg 13 of the stub axle and the lower bearing 11 is fixed to the lower leg 14 of the stub axle. The kin pin 3 is fixed to an axle element 4 (see FIG. 2) in a manner that will also be familiar to the person skilled in the art. The steering system also comprises a power unit 5, shown in the form of a motor that is fixed to the stub axle 2. The motor 5 and the king pin 3 also comprise a power transmission shown as having two toothed segments 6, 7.

Figure 2:
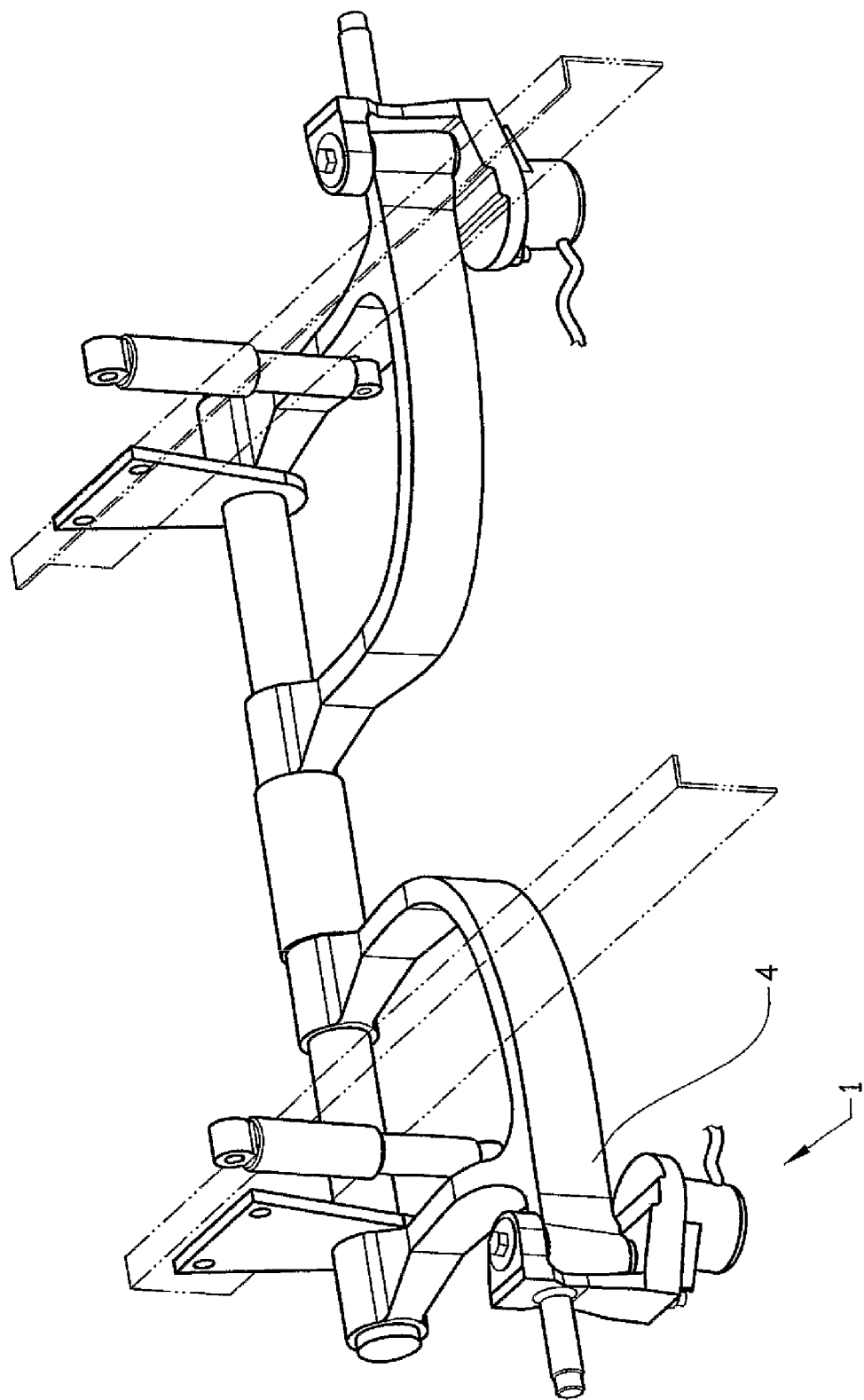
FIG. 2 is a perspective view showing a schematic diagram of a steering system according to the invention fitted at the front of a truck.

FIG. 2 shows in schematic form two steering systems 1, each fitted to an axle element 4. The axle elements 4 form part of the front end of a truck in which the axle elements 4 are spring suspension-mounted on the vehicle in a manner that will be familiar to the person skilled in the art. The axle elements 4 may either be a rigid front axle or, as shown, an independent wheel suspension.

The motor 5 is fixed to the stub axle 2 by a suitable mechanical connection, such as a bolted connection comprising bolts 8. In this example the motor 5 is fixed to the lower leg 14 of the stub axle, which is modified so that the motor can be fixed in a manner affording mechanical stability. The motor can be fixed to the upper or lower leg of the stub axle depending, among other things, on the space available. It is advantageous to fix the motor to the lower leg of the stub axle, since a king pin is often fastened to the upper leg. It is also possible, where required, to fit a motor to each leg.

The motor 5 can advantageously be detached from the stub axle 2 for servicing or replacement. The bearing surfaces of the motor 5 against the stub axle 2 are advantageously provided with some form of seal 9, so that water, dirt and the like cannot get into the motor and into the power transmission between the motor and the king pin.

Power is suitably transmitted between the motor 5 and the king pin 3 by some type of toothed gear device, for example two toothed segments 6, 7. The toothed segment 6 is rotationally locked, by means of splines, for example, to the king pin 3, and the toothed segment 7 is rotationally locked, by means of splines, for example, to the shaft of the motor 5. Since the angle by which the stub axle 2 can turn in relation to the king pin 3 is limited, (e. g. max+/−40 degrees) the king pin 3 may be provided with a toothed segment 6 which corresponds to this angle.

The ratio between the two toothed segments 6, 7 (the power transmission gear ratio) is determined by, among other things, the maximum torque of the motor and the maximum torque required for the steering system to be able to turn a wheel. In the example described, the ratio between the two toothed segments 6, 7 is such that the gear ratio is approximately 4 to 1. Suitable gear ratios are between 1:1 and 20:1. This means that the motor 5 will turn multiple revolutions during a full wheel pivot movement, so that the toothed segment 7 takes the form of a full gear wheel. Depending on the design and dimensions of the motor 5, for example whether a gearing is built into the motor 5, the motor 5 may therefore also act directly on the king pin 3 or be integrated with the latter without any additional power transmission. For example, the shaft of the motor 5 may fit in a recess in the king pin 3.

The motor 5 is advantageously a hydraulic motor, although other types of motors are feasible, such as some form of electric motor. The advantages of a hydraulic motor are that it can be of compact construction, it has a good power-to-weight ratio and it is easy to control. The motor 5 together with the power transmission gearing can be designed so as to meet the relevant statutory requirements. The power to the motor and any control signals are fed via a flexible connection 12 in a manner that will be familiar to the person skilled in the art; that is to say, via hydraulic hoses and/or electrical leads.

The motor may be hydraulically controllable. This allows two motors, one on either side of the vehicle to be connected to a steering gear with hydraulic control output. This means that a steering wheel angle is transmitted directly via the steering gear to the motors which in turn steer the wheels. In this case, either the steering gear or the power transmission device may comprise a means of adjusting the steering angle as a function of the wheel pivot movement.

In the example shown, the motor is designed to be controlled electrically. This means that the vehicle steering system can be fully self-contained, thereby making it very compact and flexible. There is no longer any need for steering gear and continuous steering column which makes the vehicle lighter.

When the motor is electrically controlled, the steering system advantageously comprises a sensor which detects the wheel angle. This sensor is suitably incorporated into the king pin, for example built into the tapered bearing, or the power transmission, on the motor shaft, for example. The sensor may be either an analog sensor or a pulse generator, and it may also be absolute or relative. The sensor may work on a resistance, optical or magnetic principle, or a combination of these. An absolute sensor is calibrated at the time of manufacture so that the sensor output signal corresponds to the angle of the wheel. A pulse generator emits a number of pulses corresponding to a specific angle change, for example. With a pulse generator, therefore, the vehicle control unit must be calibrated at the time of manufacture so that the control unit begins to count pulses when the wheels are in a known position.

The steering system therefore advantageously has both a sensor providing angle information and a sensor that indicates a predefined calibration position of the wheel, for example when the wheel is pointing straight forwards. This means that the sensor providing the angle information can be checked each time that the wheel is in the predefined calibration position. This sensor is set during manufacture or it can be incorporated into the king pin so that it does not need to be readjusted.

With suitably selected tolerances and sensors, this means that the wheel angles on the vehicle do not need to be mechanically adjusted during production.

In a second preferred embodiment the steering system is provided with a sensor which detects the lateral force acting on the wheel. This sensor is suitably fitted to the stub axle. This sensor can be used to adjust the angles of the wheels relative to one another; that is, to the so-called toe-in orientation. Normally, the front wheels on a vehicle are angled somewhat inwards; that is to say, the wheels have a toe-in of 1.5 mm/m, for example. This makes the vehicle easier to handle at low speeds. This also means that a force will act on the wheels when it is being driven. It is this force that is measured by the sensor.

At higher speeds, over 40 kilometers per hour, for example, it is advantageous to compensate fully for the toe-in. This can be achieved in that the steering system turns the wheels somewhat apart so that the lateral force acting on the wheels becomes zero. That is to say, so that the wheels are pointing straight forward. At least one advantage of this function is that it reduces tire wear.

In a third preferred embodiment, setting or calibration of the toe-in and wheel angles can also be performed automatically. This is done by measuring the lateral force acting on the wheels at a certain speed, for example traveling on a main road. When the wheels are adjusted so that no force is acting on the wheels, this means that the wheels are pointing straight forwards.

This position of the wheels can then be used as a calibration position in which the wheels are pointing straight forward. From this position the angles of the wheel can then be adjusted to the desired value.

In a third preferred embodiment, the steering system according to the invention allows the steering angles and wheel lock to be readily adjusted to external parameters. Thus, at high speed, for example, a certain steering wheel angle can result in a smaller wheel pivot movement, so-called progressive steering. At the same time the steering can be made very light when the vehicle is stationary or when maneuvering. It is also possible to adjust the wheel pivot movement independently. When a vehicle is cornering the wheels must have different wheel angles, this facility is known as Ackermann steering. The optimum Ackermann steer angle for a vehicle depends on, among other things, the vehicle wheelbase. For a range of vehicles, therefore, the Ackermann steering angle should be adjusted to the different wheelbases and wheel configurations encountered. In order to provide an optimum Ackermann steer angle for each vehicle, a number of different items are required. A vehicle manufacturer may also have one Ackermann steer angle on all vehicles regardless of wheel configuration or wheelbase. This means that the angles of the wheels in relation to one another are not optimal when the vehicle is cornering.

With the present steering system, the Ackermann steer angle can easily be adjusted to the optimum for all vehicle variants.

Yet another advantage of the steering system according to the invention is that the maximum wheel pivot movement for the vehicle can be increased. This is partly because a steering system according to the invention is more compact than a conventional steering system, and partly because the maximum wheel pivot movement can be optimized for the different vehicle variants. The maximum wheel pivot movement is stored in a data set specific to the vehicle, in which the wheel pivot movement can be adjusted according to the equipment provided just on that vehicle. This means that on different vehicle variants, the wheel pivot movement can be maximized as a function of the tire size, suspension, wheel base and the like without the wheel hitting any part of the vehicle. This means that each vehicle will have the greatest possible wheel pivot movement; that is to say, the smallest possible turning circle radius.

In a fourth preferred embodiment of the steering system according to the invention the steering system is provided with two power units in the form of, for example, two motors. This may be advantageous in several respects. Firstly it may be easier to accommodate two smaller motors than one larger motor. Secondly, there is a certain redundancy in the system in case one motor should become defective. Furthermore, two motors can be controlled so that they brace one another; that is to say that any play in the power transmission can be compensated for. The motors can either be fitted to one of the legs of the stub axle or one motor can be fitted to each leg.

FIG. 1 shows an embodiment in which the longitudinal axes of the king pin 3 and the motor 5 are parallel.

This facilitates the design of the power transmission between the motor and the king pin. For reasons of space, among other things, and depending on the design of the motor, it may be advantageous to fit the motor at a certain angle in relation to the king pin. The power transmission is adapted to suit this angle.

In a fifth advantageous embodiment, the steering system is fitted to an independently sprung suspension arm as shown in FIG. 2. Combining the steering system according to the invention with an independent front wheel suspension is particularly advantageous since this dispenses with the fixed connection between the two wheels (in the form of a rigid front axle and steering linkage). This means that the engine can be vertically located without reference to the steering system and the wheel suspension. The engine can thereby be located lower down. Moreover, an independently sprung suspension arm allows the steering system to be easily fitted anywhere on the vehicle where there is a need for more steered axles.

The advantage of a steering system according to the invention becomes even more apparent in a vehicle having two steered front axles. Double steered front axles normally create great problems in finding space for steering linkages and other steering components. With a steering system configured according to the teachings of the present invention, the same components can also be used for the second steered axle.

Adjusting the steering system to different wheel pivot movements for each axle is easy since each motor is independently controlled. The correct dataset for the vehicle configuration in question is downloaded in production. This eliminates the problem of adjusting the steering pivot movement mechanically. It also dispenses with different special embodiments for certain vehicle combinations.

Yet another advantage of the steering system according to the invention occurs when the vehicle is equipped with a steered rear axle. Such a steered rear axle can also be designed with a steering system according to the invention, either fitted on either side of a rigid rear axle or on two independent wheel suspensions. Even in the case of long buses and articulated buses, accessibility can be improved considerably through the use of a steering system according to the present invention.

In a second development of the inventive steering system, it is also possible to use a steering system on a trailer vehicle which can be coupled to the vehicle. This may be advantageous on tractor-trailer combinations which need to get through narrow streets or which frequently need to be maneuvered. The facility for steering each wheel separately makes reversing, for example, considerably easier. For example, when the steering wheel pivot movement exceeds a predefined value and when the speed is low and the vehicle is being reversed, the tractor-trailer unit can "crab", that is to say move sideways when maneuvering.

In a first example of an embodiment of the method according to the invention for steering a vehicle, the vehicle comprises two stub axles that are each articulated on a separate king pin. Each king pin is fixed to an element, spring suspension-mounted on the vehicle, such as a rigid front axle, or is fixed to a separate spring suspension-mounted element, for example an independent wheel suspension. A power unit in the form of a motor, for example, is fitted into the respective stub axle. By suitably controlling the motor, each stub axle can be turned in relation to each king pin. A motor may be an hydraulic motor or an electric motor.

Each power unit is advantageously electrically controlled by a control signal from an electronic control unit situated in the vehicle. By delivering independent control signals to each power unit, the vehicle can be readily steered with it being possible, among other things, to adjust the wheel pivot movement and wheel angles independently for each power unit and to adjust them to different driving situations. For example, a control signal may be a function of the vehicle speed so that, for example, the steering wheel angle relative to the wheel pivot movement can be adjusted to the speed of the vehicle.

It is also possible to control the power units hydraulically, for example, from a steering gear.

The invention must not be regarded as being limited to the examples or embodiments described above, but a number of further variants and modifications are feasible within the scope of the patent claims. The steering system may be also used, for example, for other types of vehicles in which independent wheel steering is advantageous.

What is claimed is:

1. A steering system (1) for a vehicle, said system comprising:
   a stub axle (2) articulated on a king pin (3) configured to be fixed relative to an axle element (4) of a spring suspension-mounted in the vehicle; and
   at least one power unit (5) fixed to the stub axle (2), the power unit (5) transmitting torque to the king pin (3).

2. The steering system as recited in claim 1, further comprising:
   a transmission (6, 7) that transmits torque from the power unit (5) to the king pin (3).

3. The steering system as recited in claim 2, wherein said transmission (6, 7) further comprises a gear for adjusting the torque of the power unit (5).

4. The steering system as recited in claim 2, wherein said transmission (6, 7) further comprises a toothed gear device.

5. The steering system as recited in claim 1, wherein said at least one power unit (5) is an hydraulic motor.

6. The steering system as recited in claim 1, wherein said at least one power unit (5) is an electric motor.

7. The steering system as recited in claim 1, wherein said at least one power unit (5) is electrically controllable.

8. The steering system as recited in claim 1, wherein said at least one power unit (5) is located so that a longitudinal axis of the power unit (5) is not parallel to the longitudinal axis of the king pin (3).

9. The steering system as recited in claim 1, further comprising:
   a sensor that provides information on the angular difference between the stub axle (2) and the king pin (3).

10. The steering system as recited in claim 1, further comprising:
    a sensor that provides information on the torque acting on the stub axle (2).

11. A method of steering a vehicle having at least two stub axles that are each articulated on a separate king pin, the king pins being fixed to at least one axle element spring suspension-mounted in the vehicle, said method comprising:
    turning each stub axle in relation to a respective king pin by means of at least two power units, wherein each power unit is fitted to a separate stub axle.

12. The method as recited in claim 11, wherein each power unit is electrically controlled by a control signal.

13. The method as recited in claim 12, wherein the control signals are a function of the speed of the vehicle.

14. The method as recited in claim 11, further comprising:
    delivering independent control signals to each power unit.

15. The method as recited in claim 14, wherein the control signals are a function of the speed of the vehicle.

16. A vehicle comprising at least two steering systems wherein each steering system comprises:
    a stub axle (2) articulated on a king pin (3) configured to be fixed relative to an axle element (4) of a spring suspension-mounted in the vehicle; and
    at least one power unit (5) fixed to the stub axle (2), the power unit (5) transmitting torque to the king pin (3).

17. The vehicle as recited in claim 16, wherein the steering system further comprises a transmission (6, 7) that transmits torque from the power unit (5) to the king pin (3).

18. The vehicle as recited in claim 17, wherein said transmission (6, 7) further comprises a gear for adjusting the torque of the power unit (5).

19. The vehicle as recited in claim 17, wherein said transmission (6, 7) further comprises a toothed gear device.

20. The vehicle as recited in claim 16, wherein said at least one power unit (5) is located so that a longitudinal axis of the power unit (5) is not parallel to the longitudinal axis of the king pin (3).

21. The vehicle as recited in claim 16, wherein the steering system further comprises a sensor that provides information on the angular difference between the stub axle (2) and the king pin (3).

22. The vehicle as recited in claim 16, wherein the steering system further comprises a sensor that provides information on the torque acting on the stub axle (2).

* * * * *